United States Patent
Hirashima (10) Patent No.: US 6,834,029 B2
(45) Date of Patent: Dec. 21, 2004

(54) FOCUSING SERVO APPARATUS FOR OPTICAL PICKUP

(75) Inventor: Minoru Hirashima, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 417 days.

(21) Appl. No.: 10/038,887

(22) Filed: Jan. 2, 2002

(65) Prior Publication Data

US 2002/0141300 A1 Oct. 3, 2002

(30) Foreign Application Priority Data

Jan. 15, 2001 (JP) .................................. P.2001-006011

(51) Int. Cl.[7] .............................................. G11B 7/095
(52) U.S. Cl. .............................. 369/44.29; 369/53.28
(58) Field of Search .................... 369/44.29, 44.27, 369/53.3, 53.28

(56) References Cited

U.S. PATENT DOCUMENTS 5,754,507 A * 5/1998 Nishikata ................. 369/44.29
6,101,156 A * 8/2000 Tanaka et al. ............ 369/44.28
6,147,942 A * 11/2000 Abe et al. ................ 369/44.27
6,154,425 A * 11/2000 Iida et al. ................ 369/44.29
2001/0017826 A1 * 8/2001 Ryu ........................ 369/44.29

FOREIGN PATENT DOCUMENTS

JP 2000-57593 2/2000
JP 2000155955 A * 6/2000 ........... G11B/7/085

* cited by examiner

Primary Examiner—Hoa T. Nguyen
Assistant Examiner—Peter Vincent Agustin
(74) Attorney, Agent, or Firm—Osha & May L.L.P.

(57) ABSTRACT

In a focusing servo apparatus for an optical pickup, an S-shaped wave of a focus error signal is measured at a point of time T1 to thereby calculate the time Δt1 required for shifting the position on the S-shaped wave from a local maximum value to a local minimum value. The speed of a lens relative to an optical disk is measured on the basis of the time αt1. When the relative speed of the lens is higher than the speed allowed to lead the focus in, the motion of the lens is braked just before (a point of time T1') the optical disk makes one rotation to thereby reduce the relative speed of the lens to make it possible to lead the focus in the optical disk steadily.

3 Claims, 4 Drawing Sheets

FOCUSING SERVO APPARATUS FOR OPTICAL PICKUP

BACKGROUND OF THE INVENTION

1. Field of the Invention

The present invention relates to a focusing servo apparatus which is used in an optical pickup for recording/reproducing data in/from an optical disk so that the focus can be led in the optical disk while the optical disk is driven to rotate.

2. Description of the Related Art

An optical disk drive has been heretofore provided so that reflected light of laser light with which a data recording surface of an optical disk is irradiated is received by an optical pickup to thereby record/reproduce data. On this occasion, surface fluctuation occurs mechanically in the optical disk driven to rotate. Therefore, a lens of the optical pickup is driven by a focus servo apparatus to lead the focus of the laser light in the data recording surface of the optical disk (focus-on). The focus-on in this case cannot respond when the speed of the lens relative to the optical disk is too high. To reduce the relative speed, therefore, the rotation of the optical disk is braked just before the focus-on.

Figure 5:
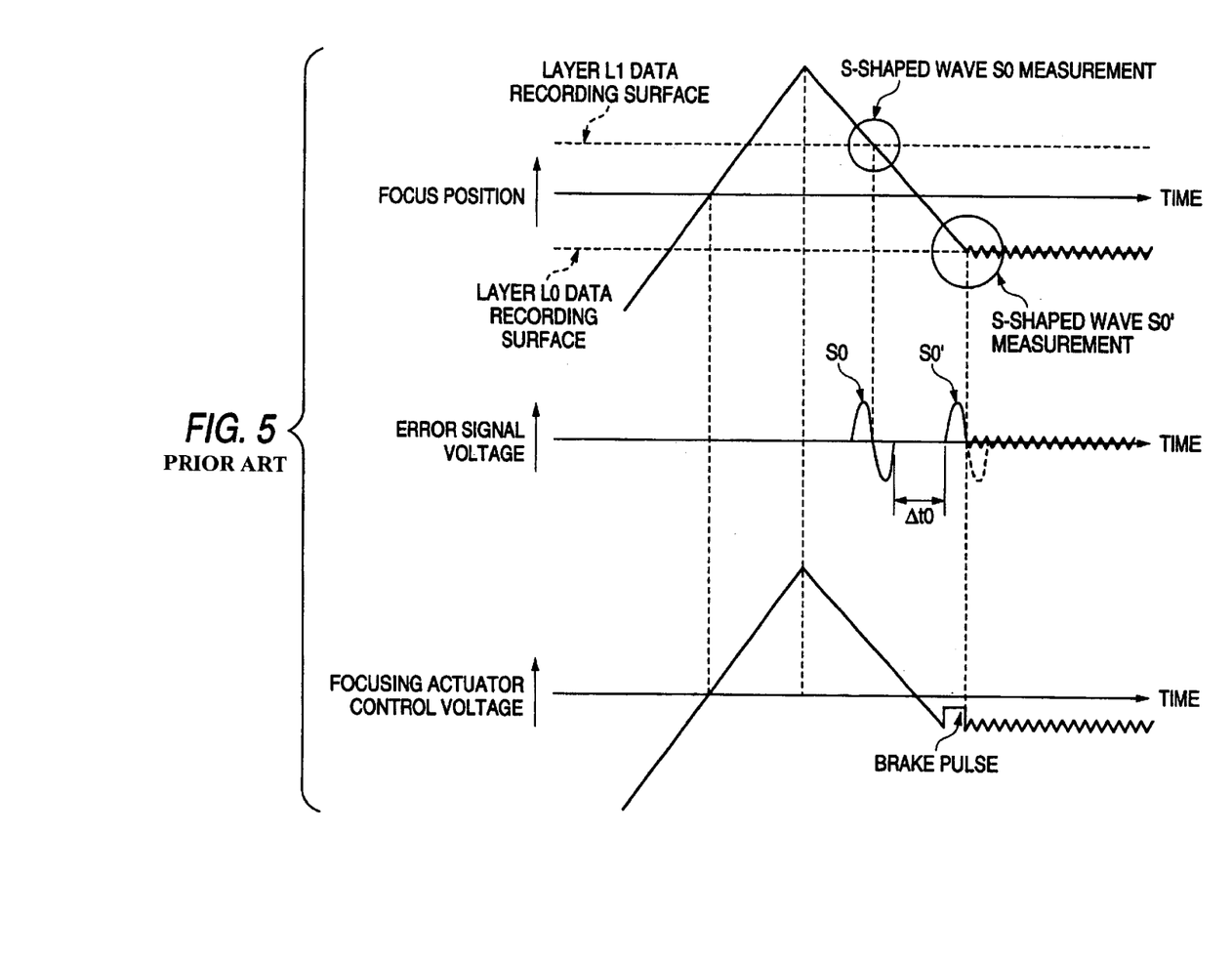
FIG. 5 is a time chart showing the focus position, the focusing control voltage and the error signal in the case where a related-art focusing servo apparatus is applied to an optical disk having data recording surfaces of two layers.

To start the optical disk rapidly, focus-on is generally performed while the optical disk (two-layer DVD) is rotated. The focus-on operation of an optical disk having data recording surfaces of two layers in an optical disk drive unit will be described below. An objective lens is moved up/down to drive the focus. As shown in FIG. 5, a focus error signal represented by an S-shaped wave generated when the focus passes through each of the data recording surfaces of two layers (L0 and L1) is detected. Focusing is performed on the basis of the distance between the two S-shaped waves. Here are detected focus error signals S0 and S0' generated when the focus passes through the two layers L1 and L0 respectively in the condition that the objective lens descends. The relative speed is measured on the basis of the distance $\Delta t0$ between the signals S0 and S0'. When the relative speed is so high that focus-on cannot be achieved by ordinary focusing, a brake pulse is sent to an objective lens drive circuit just before the focusing on the layer L0. In this manner, the relative speed is reduced so that the focus can be led in the layer L0.

On the other hand, there is known an apparatus in which when the focus of an objective lens is moved from a first layer to a second layer, a kick voltage to move the objective lens is applied to an objective lens moving unit until the level of the focus error signal reaches a predetermined value, the speed of the focus relative to the data recording surface of the second layer is measured on the basis of the applied time of the kick voltage, and a brake voltage corresponding to the relative speed is applied to the objective lens moving unit to thereby lead the focus in the second layer (for example, see JP-A-2000-57593).

As described above, the system of detecting focus error signals corresponding to the data recording surfaces of the two layers, however, cannot be applied to an optical disk (such as CD or one-layer DVD) having a recording surface of one layer because the relative speed is detected on the basis of the distance between the two focus error signals.

Moreover, if the rotation of the optical disk is always braked, it may be impossible to lead the focus in the recording surface of the optical disk because the motion of the optical disk and the motion of the lens are reversed to each other when the speed of the lens relative to the recording surface of the disk is low.

SUMMARY OF THE INVENTION

The invention is devised to solve the problem and an object of the invention is to provide a focusing servo apparatus for optical pickup in which both reduction in the starting time and steady leading-in of the focus can be achieved by leading the focus in an optical disk while driving the optical disk to rotate no matter when the optical disk has recording surf aces of two layers or a recording surface of one layer.

(1) To achieve the foregoing object, in accordance with the invention, there is provided a focusing servo apparatus for optical pickup having: an optical pickup including an optical system for irradiating an optical disk driven to rotate with light, and a photo detector for receiving reflected light from the optical disk, the optical system having a light source, and a lens; a focusing drive unit adapted to move the lens in a direction of an optical axis to thereby focus the optical system on a data recording surface of the optical disk; an error signal detecting unit adapted to detect a focus error signal generated when the focus passes through the data recording surface of the optical disk in accordance with the movement of the lens on the basis of a signal detected by the photo detector; and a brake pulse generating unit adapted to send a brake pulse to the focusing drive unit to reduce the speed of the lens relative to the optical disk, the focus being led in the data recording surface of the optical disk by the focusing drive unit; wherein the focusing drive unit starts the movement of the lens in any timing and performs the movement of the lens in the same period as the rotating period of the optical disk until the focus is led in; wherein the error signal detecting unit detects an S-shaped wave of the focus error signal and measures the speed of the lens relative to the optical disk on the basis of the time required from a point of time when the position on the detected S-shaped wave descends to a value lower than a predetermined first threshold value after taking a local maximum value to a point of time when the position on the S-shaped wave ascends to a value higher than a predetermined second threshold value after taking a local minimum value coming next; and wherein the brake pulse generating unit sends a predetermined brake pulse to the focusing drive unit just before the completion of the one-rotation period of the optical disk after the detection of the S-shaped wave when the relative speed measured by the error signal detecting unit is higher than the speed allowed to lead the focus in, but does not send any brake pulse when the relative speed is allowed to lead the focus in.

In this configuration, the focusing drive unit starts the movement of the lens in any timing relative to the optical disk which is driven to rotate while a surface of the optical disk fluctuates. Thereafter, the movement of the lens is synchronized with the rotating period of the optical disk until leading-in of the focus succeeds. A focus error signal generated when the focus passes through the recording surface of the optical disk in accordance with the movement of the lens is detected by the error signal detecting unit. The focus error signal is detected as an S-shaped wave having one local maximum value and one local minimum value with respect to one recording surface. In this configuration, the time required for shifting the position on the S-shaped wave from the local maximum value to the local minimum value is approximated as the time from a point of time when the position is lower than a predetermined first threshold value to a point of time when the position is higher than a predetermined second threshold value. Here, the first threshold value is defined as a value slightly smaller than the value approximated by the local maximum value, and the second value is defined as a value slightly larger than the value approximated by the local minimum value.

As described above, the focus error signal detected as the S-shaped wave is a signal generated when the focus passes through the recording surface of the optical disk. Hence, the time required for shifting the position on the S-shaped wave from the local maximum value to the local minimum value depends on the speed of the focus relative to the optical disk. Hence, when a predetermined arithmetic operation is performed on the basis of the time required for shifting the position on the S-shaped wave from the local maximum value to the local minimum value, the speed of the focus relative to the optical disk can be measured. Further, the invention can be applied to an optical disk having a recording surface of one layer because the relative speed is measured on the basis of the local maximum and minimum values constituting one S-shaped wave. Incidentally, when a single focal lens is used as the lens, the speed of the focus relative to the optical disk is substantially equivalent to the speed of the lens relative to the optical disk.

If the speed of the focus relative to the optical disk is too high, the focusing servo apparatus cannot lead the focus in. Therefore, when the measured speed of the focus relative to the optical disk is higher than the speed sufficient to perform focus-on, the brake pulse generating unit performs control to reduce the relative speed to lead the focus in by sending a predetermined brake pulse to the focusing drive unit just before the optical disk makes one rotation after the detection of the S-shaped wave. Incidentally, because the movement of the lens is synchronized with the rotating period of the optical disk until the focus is led in, the speed of the focus relative to the optical disk at the time of the detection of the S-shaped wave is reproduced when the focusing drive unit outputs the brake pulse. As a result, the measured result of the relative speed is fed back effectively, so that the focus can be led in steadily. When the relative speed is lower than the predetermined speed, the focus is led in without any brake pulse output.

(2) According to the invention, there is provided a focusing servo apparatus for optical pickup having: an optical pickup including an optical system for irradiating an optical disk driven to rotate with light, and a photo detector for receiving reflected light from the optical disk, the optical system having a light source, and a lens; a focusing drive unit adapted to move the lens in a direction of an optical axis to thereby focus the optical system on a data recording surface of the optical disk; an error signal detecting unit adapted to detect a focus error signal generated when the focus passes through the data recording surface of the optical disk in accordance with the movement of the lens on the basis of a signal detected by the photo detector; and a brake pulse generating unit adapted to send a brake pulse to the focusing drive unit to reduce the speed of the lens relative to the optical disk, the focus being led in the data recording surface of the optical disk by the focusing drive unit; wherein the focusing drive unit starts the movement of the lens in any timing and performs the movement of the lens in the same period as the rotating period of the optical disk until the focus is led in; wherein the error signal detecting unit detects an S-shaped wave of the focus error signal and measures the speed of the lens relative to the optical disk on the basis of the detected S-shaped wave; and wherein the brake pulse generating unit sends a predetermined brake pulse to the focusing drive unit when the relative speed measured by the error signal detecting unit is higher than the speed allowed to lead the focus in, but does not send any brake pulse when the relative speed is allowed to lead the focus in.

In this configuration, the speed of the focus relative to the optical disk need not be measured on the basis of the time required for shifting the position on the S-shaped wave from the local maximum value to the local minimum value. That is, the relative speed can be measured on the basis of the S-shaped wave. Accordingly, for example, the relative speed may be measured on the basis of the time required for shifting the position on the S-shaped wave from a predetermined first value to a predetermined second value. Further, the timing for outputting a brake pulse is not limited. Hence, even in the case where a photoelectric device, a CPU, etc. used in the error signal detecting unit are limited, the brake pulse can be output in the timing in accordance with the processing speed of the error signal detecting unit so that the focus can be led in.

(3) According to the invention, the brake pulse generating unit issues a predetermined brake pulse to the focusing drive unit just before the completion of the one-rotation period of the optical disk after the detection of the S-shaped wave.

In this configuration, because the timing for outputting the brake pulse is just before the completion of the one-rotation period of the optical disk after the detection of the S-shaped wave, the measured result of the relative speed is fed back effectively in the same manner as in (1) so that the focus can be led in steadily.

DETAILED DESCRIPTION OF THE PREFERRED EMBODIMENTS

Figure 1:
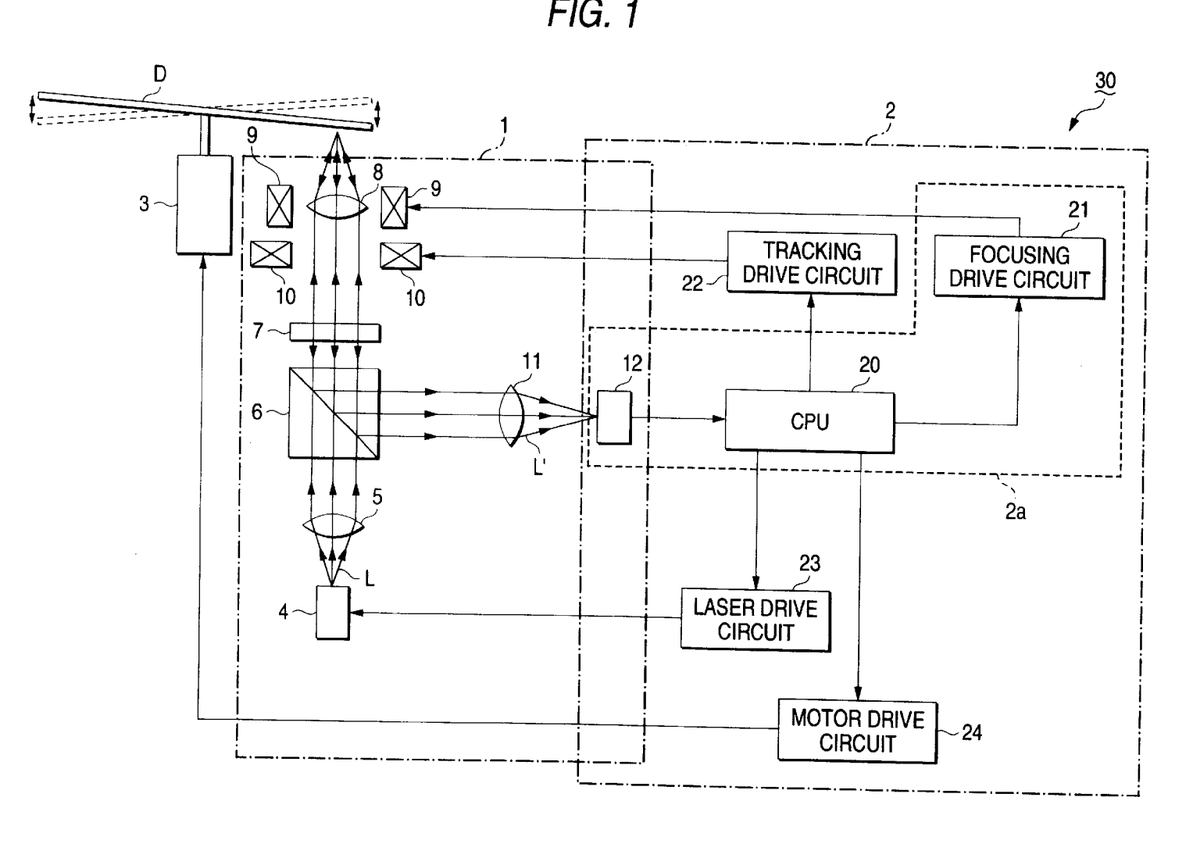
FIG. 1 is a configuration diagram of an optical disk drive according to an embodiment of the invention.

An optical disk drive according to an embodiment of the invention will be described below by referring to the drawings. FIG. 1 shows a configuration of the optical disk drive. The optical disk drive 30 is provided with an optical pickup 1, a control circuit 2, and a spindle motor 3. The optical pickup 1 performs recording/reproducing data by using light as a medium. The control circuit 2 controls the optical pickup 1 and the optical disk drive 30 as a whole. The spindle motor 3 drives an optical disk D to rotate.

The optical pickup 1 includes a semiconductor laser 4, a collimator lens 5, a beam splitter 6, a quarter-wave plate 7, an objective lens 8, a focusing actuator 9, a tracking actuator 10, a condenser lens 11, and a photo detector 12. The collimator lens 5 is disposed linearly in a direction of the optical axis of laser light L emitted from the semiconductor laser 4. The condenser lens 11 is disposed linearly in a direction perpendicular to the optical axis of the laser light L, that is, in a direction of the optical axis of split light parted by the beam splitter 6. The control circuit 2 includes a CPU 20, a photo detector 12, a focusing drive circuit 21, a tracking drive circuit 22, a laser drive circuit 23, and a spindle motor drive circuit 24. The photo detector 12 sends a detection signal to the CPU 20. The focusing drive circuit 21 operates on the basis of an instruction given from the CPU 20. The photo detector 12, the CPU 20 and the focusing drive circuit 21 constitute a focusing servo control circuit 2a. The semiconductor laser 4, the collimator lens 5, the beam splitter 6, the quarter-wave plate 7, the objective lens 8 and the condenser lens 11 constitute an optical system. The focusing drive circuit 21 and the focusing actuator 9 constitute a focusing drive unit. The photo detector 12 and the CPU 20 constitute an error signal detecting unit. The CPU 20 and the focusing drive circuit 21 constitute a brake pulse generating unit.

Laser light L emitted from the semiconductor laser 4 is shaped into parallel rays by the collimator lens 5. The parallel rays are transmitted through the beam splitter 6 and the quarter-wave plate 7 and condensed onto a recording surface of the optical disk D by the objective lens 8. A coil (not shown) is built in the focusing actuator 9. A voltage applied to the coil is controlled to move the objective lens 8 up and down to thereby adjust the focal point of the laser light L in a direction of the optical axis in accordance with the recording surface of the optical disk D. Similarly, a coil (not shown) is built in the tracking actuator 10. A voltage applied to the coil is controlled to thereby adjust the focal point of the laser light L in a horizontal direction in accordance with land or groove portions which form pits of the optical disk D.

Recording/reproducing data on the basis of the optical pickup 1 will be described below. Data are recorded as follows. Laser light L corresponding to recording data is emitted from the semiconductor laser 4 on the basis of an instruction given from the CPU 20 through the laser drive circuit 23. The laser light L is condensed toward the land or groove portions of the rotating optical disk D by the objective lens 8, so that a substrate on the optical disk D is thermally deformed to form pits. That is, pits corresponding to recording data are formed in the land or groove portions. On the other hand, recorded data are reproduced as follows. Laser light L slightly weaker than that at the recording time is emitted from the laser semiconductor 4. The laser light L is condensed toward the land or groove portions of the optical disk D by the objective lens 8. Reflected rays from the optical disk D are transmitted through the objective lens 8 and the quarter-wave plate 7 and reflected toward the condenser lens 11 by the beam splitter 6. The reflected light L' is detected by the photo detector 12. In the photo detector 12, the optical signal of the light L' is photoelectrically converted into an electric signal. Reflected light from the portion with pits formed is not detected by the photo detector 12 because the portion with pits is lower in reflectance than the portion without any pit formed. Hence, the electric signal obtained by photoelectric conversion in the photo detector 12 is made to correspond to recording data. The electric signal detected by the photo detector 12 is taken in the CPU 20, so that data such as audio data or image data are reproduced.

The CPU 20 executes a predetermined arithmetic operation on the basis of a program stored in a memory contained in the control circuit 2 to thereby control the optical disk drive 30. The focusing drive circuit 21 applies a driving voltage to the coil of the focusing actuator 9 on the basis of an instruction given from the CPU 20. Similarly, the tracking drive circuit 22 applies a driving voltage to the coil of the tracking actuator 10 on the basis of an instruction given from the CPU 20. The laser drive circuit 23 drives the semiconductor laser 4. At the data recording time, the laser drive circuit 23 receives an electric signal transmitted on the basis of recording data from the CPU 20 and applies a driving voltage to the semiconductor laser 4 while laser light L corresponding to the electric signal is synchronized with the rotation of the optical disk D. The spindle motor drive circuit 24 applies a driving voltage to the spindle motor 3 so that the rotational speed of the optical disk D is set to a predetermined value (for example, of 6 Hz in this embodiment).

Figure 2A:
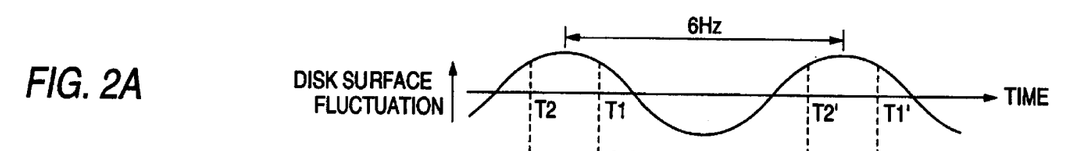
FIGS. 2A to 2E are time charts showing the surface fluctuation of an optical disk, a focusing control voltage and an error signal in a focusing servo apparatus for the optical disk drive.
Figures 2B, 2C:
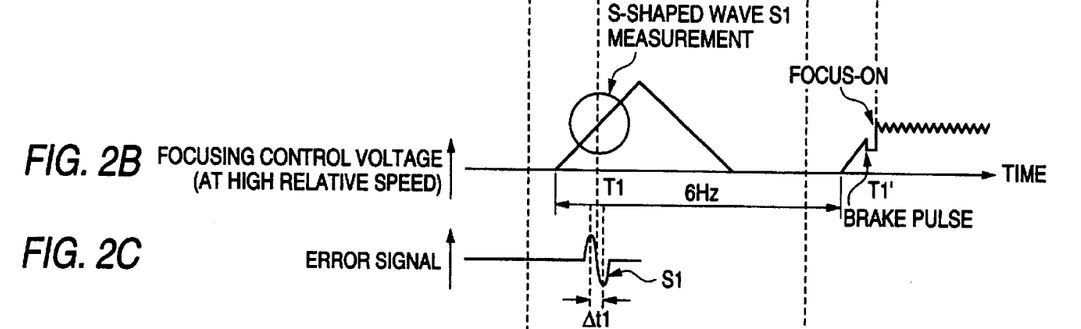
Figures 2D, 2E:
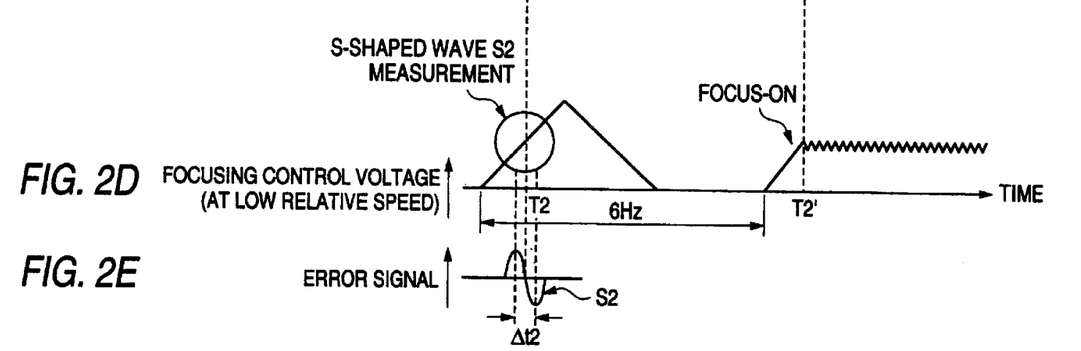

The focus-on operation of the optical pickup 1 in this embodiment will be described below with reference to FIGS. 2A to 2E. In FIGS. 2A to 2E, the waveform of FIG. 2A represents a surface fluctuation of the data recording surface of the optical disk D. The waveforms of FIGS. 2B and 2D represent applied voltages for controlling the drive of the objective lens 8. The waveform of FIG. 2B shows the case where the speed of the optical disk D relative to the objective lens 8 is high whereas the waveform of FIG. 2D shows the case where the speed is low. The waveforms of FIGS. 2C and 2E represent error signal voltages measured in the cases of the waveforms of FIGS. 2B and 2D respectively. Incidentally, the objective lens 8 substantially makes the same up-down motion as those of the control voltages represented by the waveforms of FIGS. 2B and 2D.

Upon reception of an instruction from the focusing drive circuit 21, the focusing actuator 9 moves the objective lens 8 relative to the rotating optical disk D in any timing and detects the speed of the focus relative to the optical disk D (focus-search). The motion of the objective lens 8 is controlled by the focusing drive circuit 21 so that the objective lens 8 rotates at the speed of the same period (6 Hz) as the rotating period of the optical disk D in order to perform feedback control at the focus-leading (focus-on) time.

Assume now that the objective lens 8 is moved in the timing represented by the waveform of FIG. 2B with respect to the surface fluctuation of the optical disk represented by the waveform of FIG. 2A. Then, a focus error signal S1 of S-shaped wave is measured by the photo detector 12 at a point of time T1. The CPU 20 calculates the time $\Delta t1$ required for shifting the position on the S-shaped wave from a local maximum value to a local minimum value. At the point of time T1, a voltage to raise the focus is applied to the objective lens 8 while the optical disk D descends. Hence, the speed of the focus relative to the optical disk D is so high that the S-shaped wave is converged in a short time. As a result, the time $\Delta t1$ takes a small value. The CPU 20 makes a judgment that it is difficult to lead the focus in if $\Delta t1$ is smaller than a predetermined value, that is, if the relative speed of the focus is higher than the speed required for entering focus-on. On the basis of the judgment, the CPU 20 gives an instruction to the focusing drive circuit 21 to reduce the moving speed of the objective lens 8. Upon reception of the instruction, the focusing drive circuit 21 sends a predetermined brake pulse to the focusing actuator 9 just before (a point of time: T1') the optical disk D makes one rotation after the point of time T1 at which the S-shaped wave is measured. At a result, the moving speed of the objective lens 8 is reduced so that the speed of the focus relative to the optical disk D is reduced. In this manner, focus-on starts at the point of time T1'.

On the other hand, when the objective lens 8 is moved in the timing represented by the waveform of FIG. 2D, a focus error signal S2 of S-shaped wave is measured by the photo detector 12 at a point of time T2. The CPU 20 calculates the time Δt2 in the same manner as described above. At the point of time T2, a voltage to raise the focus is applied to the objective lens 8. Hence, the speed of the focus relative to the optical disk D is so low that the converging time of the S-shaped wave is made longer than the converging time described above. As a result, the time Δt2 takes a large value. The CPU 20 makes a judgment that it is possible to lead the focus in if Δt2 is not smaller than a predetermined value, that is, if the relative speed of the focus allows focus-on to start. On the basis of the judgment, the CPU 20 does not issue an instruction to the focusing drive circuit 21 to reduce the moving speed of the objective lens 8. As a result, focus-on starts at a point of time T2' at which the optical disk D makes one rotation after the point of time T2 at which the S-shaped wave is measured.

Figure 3:
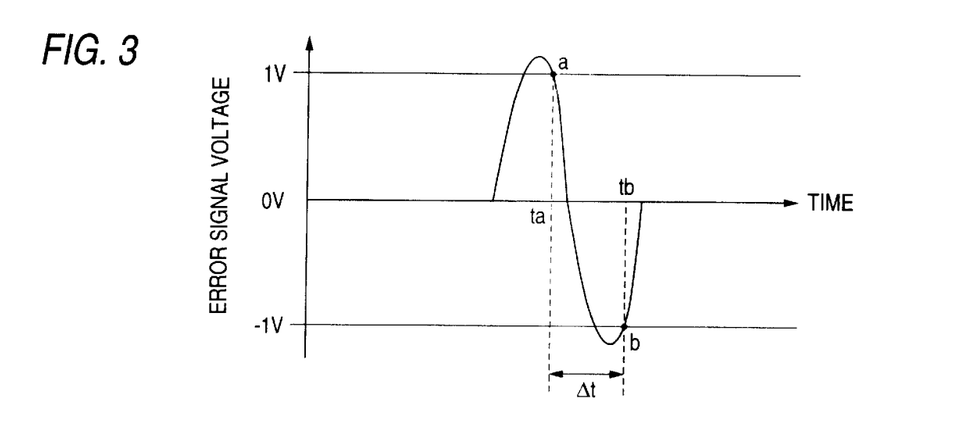
FIG. 3 is a graph for explaining a state in which the position on S-shaped wave measured by the apparatus is shifted from a local maximum value to a local minimum value.

The measurement of the time Δt required for shifting the position on the S-shaped wave from a local maximum value to a local minimum value in this embodiment will be described with reference to FIG. 3. For example, assume now that S-shaped wave as shown in FIG. 3 is detected by the photo detector 12. The voltages of the error signal in the local maximum and minimum values on the S-shaped wave can be roughly estimated because the voltages depend on the level of the voltage applied to the semiconductor laser 4. Accordingly, threshold values corresponding to the local maximum and minimum values can be determined in advance. Assume now that a (first) threshold value corresponding to the local maximum value is made 1 V and that a (second) threshold value corresponding to the local minimum value is made −1 V. Then, the error signal voltage ascends. After the error signal voltage takes the local maximum value, it becomes lower than the threshold value of 1 V at a point a (at a point of time Ta). Then, the error signal voltage further descends. After the error signal voltage takes the local minimum value, it becomes higher than the threshold value of −1 V at a point b (at a point of time Tb). Assume now that the threshold values are defined as values approximated by the local maximum and minimum values respectively. Then, the time Δt required for shifting the position on the S-shaped wave from the local maximum value to the local minimum value can be approximated as the time required for shifting the position from the point a to the point b, that is, as Ta-Tb.

Figure 4:
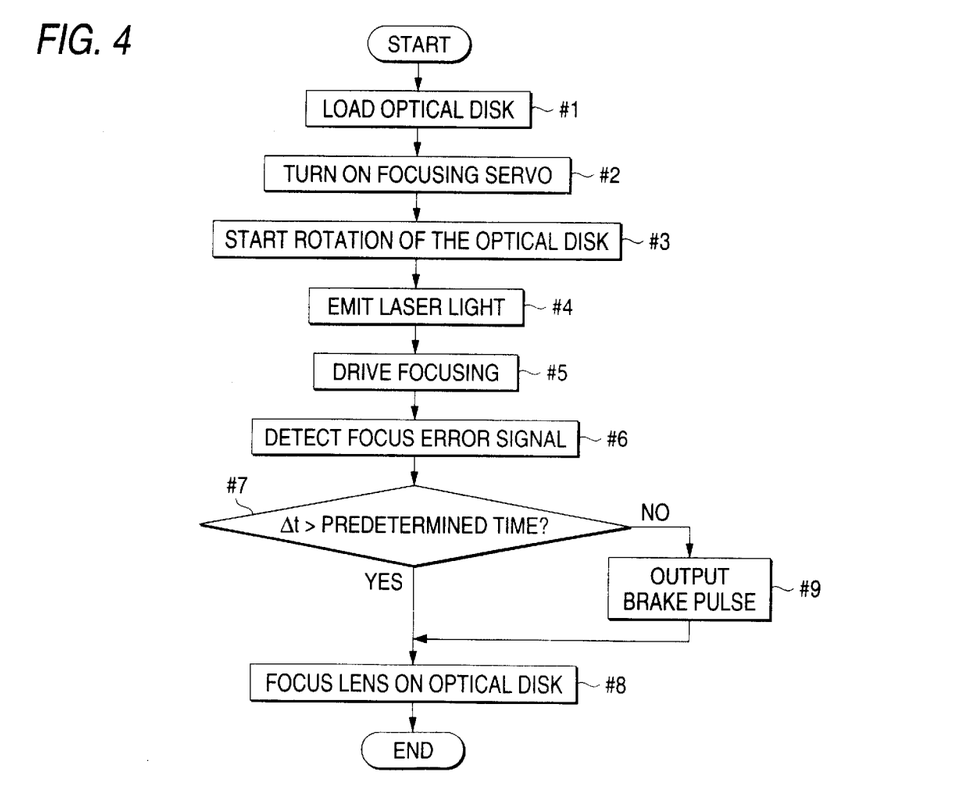
FIG. 4 is a flow chart showing the processing procedure of the CPU at the time of focus-leading in the apparatus.

The process of the CPU 20 in focusing the laser light L at the time of starting the optical disk D will be described below with reference to FIG. 4. When the optical disk D is loaded (#1), the focusing servo control circuit 2a is turned on (#2). The CPU 20 issues a rotating instruction to the spindle motor drive circuit 24 to drive the spindle motor 3 to thereby start the rotation of the optical disk D (#3). Then, the CPU 20 issues a light-emitting instruction to the laser drive circuit 23 to emit laser light L (#4). Then, the CPU 20 issues a lens-moving instruction to the focusing drive circuit 21 to drive the focusing actuator 9 to move the objective lens 8 (#5). A focus error signal is detected by the photo detector 12 (#6). If Δt is larger than a predetermined time (YES in #7), the speed of the focus relative to the optical disk D is so low that focus-on is performed (#8). If Δt is not larger than the predetermined time (NO in #7), a brake pulse is sent to the focusing drive circuit 21 (#9) to reduce the relative speed of the objective lens 8 and then focus-on is performed (#8). Incidentally, the brake pulse output in #9 is set in accordance with the value of Δt. For example, the width or voltage of the brake pulse may be changed in accordance with the value of Δt. Hence, the speed of the focus relative to the optical disk can be controlled to be lower, so that focus-on in #8 can be performed more steadily.

Incidentally, the invention is not limited to the configuration of the embodiment and various modifications may be made. For example, the threshold values are not limited to values approximated by the local maximum and minimum values and may be values for specifying the time required from the generation of the S-shaped wave to the convergence thereof. In this case, the first threshold value may be determined as a positive predetermined value and the second threshold value may be determined as a negative predetermined value. The optical disk to which the invention can be applied may have either a recording surface of one layer or recording surfaces of two layers.

The timing for outputting the brake pulse is not limited to the timing just before the optical disk D makes one rotation after the point of time T2 at which the S-shaped wave is measured. For example, the timing may be just before the optical disk D makes several rotations if the brake pulse can be synchronized with the rotation of the optical disk D. In this case, the focus can be led in steadily even if the processing speed of the CPU 20 is low or even if the CPU 20 executes another process preferentially.

The focus error signal is not limited to the configuration in which it is detected when the objective lens 8 ascends. For example, the focus error signal may be detected when the objective lens 8 descends. In this case, the brake pulse may be replaced by a kick pulse to raise the objective lens 8 if the relative speed of the objective lens 8 is high.

The rotating period of the optical disk D is not limited to 6 Hz. For example, it maybe set in accordance with recording media standards. It will go well if the focusing actuator 21 can be controlled in synchronism with the rotating period of the optical disk D. Hence, the focusing actuator 21 can be controlled in accordance with the rotating period of the optical disk D if the rotating period can be detected whenever the optical disk D makes one rotation. Accordingly, the rotating period of the optical disk D need not be constant. For example, just after the loading of the optical disk D, the leading-in of the focus may be performed in the condition that the rotating period changes in a period of time from the start of the rotation drive to the rotational speed's arrival at a predetermined value.

(1') As described above, in accordance with the invention, the speed of the focus relative to the optical disk is measured on the basis of the time required for shifting the position on the S-shaped wave of the detected focus error signal from a local maximum value to a local minimum value. When the relative speed of the focus is higher than the speed required for entering focus-on, a predetermined brake pulse is output in synchronism with the rotation of the optical disk to thereby perform control for reducing the relative speed. Hence, even in the case where the apparatus is applied to a one-layer optical disk relative to which the speed of the focus is high, the focus can be led in the optical disk steadily and the starting time of the optical disk can be shortened.

(2') According to the invention, the measurement of the speed of the focus relative to the optical disk is performed on the basis of the S-shaped wave. Hence, the same effect as in (1') can be obtained by the analysis of the S-shaped wave. In addition, the timing for outputting the brake pulse is not limited. Hence, the brake pulse can be output in the timing in accordance with the processing speed of the error detecting unit so that the focus can be led in.

(3') According to the invention, the timing for outputting the brake pulse is just before the completion of the one-rotation period of the optical disk on the basis of the detection of the S-shaped wave. Hence, the measurement result of the relative speed can be fed back effectively so that the focus can be led in steadily.

What is claimed is:

1. A focusing servo apparatus for an optical pickup comprising:

an optical pickup including an optical system for irradiating an optical disk driven to rotate with light, and a photo detector for receiving reflected light from said optical disk, said optical system having a light source, and a lens;

a focusing drive unit adapted to move said lens in a direction of an optical axis to thereby focus said optical system on a data recording surface of said optical disk;

an error signal detecting unit adapted to detect a focus error signal generated when the focus passes through the data recording surface of said optical disk in accordance with the movement of said lens on the basis of a signal detected by said photo detector; and a brake pulse generating unit adapted to send a brake pulse to said focusing drive unit to reduce the speed of said lens relative to said optical disk, the focus being led in the data recording surface of said optical disk by said focusing drive unit;

wherein said focusing drive unit starts the movement of said lens in any timing and performs the movement of said lens in the same period as the rotating period of said optical disk until the focus is led in; wherein said error signal detecting unit detects an S-shaped wave of said focus error signal and measures the speed of said lens relative to said optical disk on the basis of the time required from a point of time when the position on the detected S-shaped wave descends to a value lower than a predetermined first threshold value after taking a local maximum value to a point of time when the position on the S-shaped wave ascends to a value higher than a predetermined second threshold value after taking a local minimum value coming next; and wherein said brake pulse generating unit sends a predetermined brake pulse to said focusing drive unit just before the completion of the one-rotation period of said optical disk after the detection of said S-shaped wave when the relative speed measured by said error signal detecting unit is higher than the speed allowed to lead the focus in, but does not send any brake pulse when the relative speed is allowed to lead the focus in.

2. A focusing servo apparatus for an optical pickup comprising:

an optical pickup including an optical system for irradiating an optical disk driven to rotate with light, and a photo detector for receiving reflected light from said optical disk, said optical system having a light source, and a lens;

a focusing drive unit adapted to move said lens in a direction of an optical axis to thereby focus said optical system on a data recording surface of said optical disk;

an error signal detecting unit adapted to detect a focus error signal generated when the focus passes through the data recording surface of said optical disk in accordance with the movement of said lens on the basis of a signal detect by said photo detector; and a brake pulse generating unit adapted to send a brake pulse to said focusing drive unit to reduce the speed of said lens relative to said optical disk, the focus being led in the data recording surface of said optical disk by said focusing drive unit;

wherein said focusing drive unit starts the movement of said lens in any timing and performs the movement of said lens in the same period as the rotating period of said optical disk until the focus is led in; wherein said error signal detecting unit detects an S-shaped wave of said focus error signal and measures the speed of said lens relative to said optical disk on the basis of the detected S-shaped wave; and wherein said brake pulse generating unit sends a predetermined brake pulse to said focusing drive unit when the relative speed measured by said error signal detecting unit is higher than the speed allowed to lead the focus in, but does not send any brake pulse when the relative speed is allowed to lead the focus in.

3. A focusing servo apparatus for the optical pickup according to claim 2, wherein said brake pulse generating unit issues a predetermined brake pulse to said focusing drive unit just before the completion of the one-rotation period of said optical disk after the detection of said S-shaped wave.

* * * * *

UNITED STATES PATENT AND TRADEMARK OFFICE
CERTIFICATE OF CORRECTION

PATENT NO. : 6,834,029 B2 Page 1 of 1
DATED : December 21, 2004
INVENTOR(S) : Minoru Hirashima

It is certified that error appears in the above-identified patent and that said Letters Patent is hereby corrected as shown below:

<u>Title page,</u>
Item [57], ABSTRACT, please replace "$\alpha t1$" with -- $\Delta t1$ -- after the word "time".

<u>Column 10,</u>
Line 17, please replace the word "detect" with -- detected --.

Signed and Sealed this

Twenty-second Day of March, 2005

JON W. DUDAS
*Director of the United States Patent and Trademark Office*